United States Patent Office 2,937,422
Patented May 24, 1960

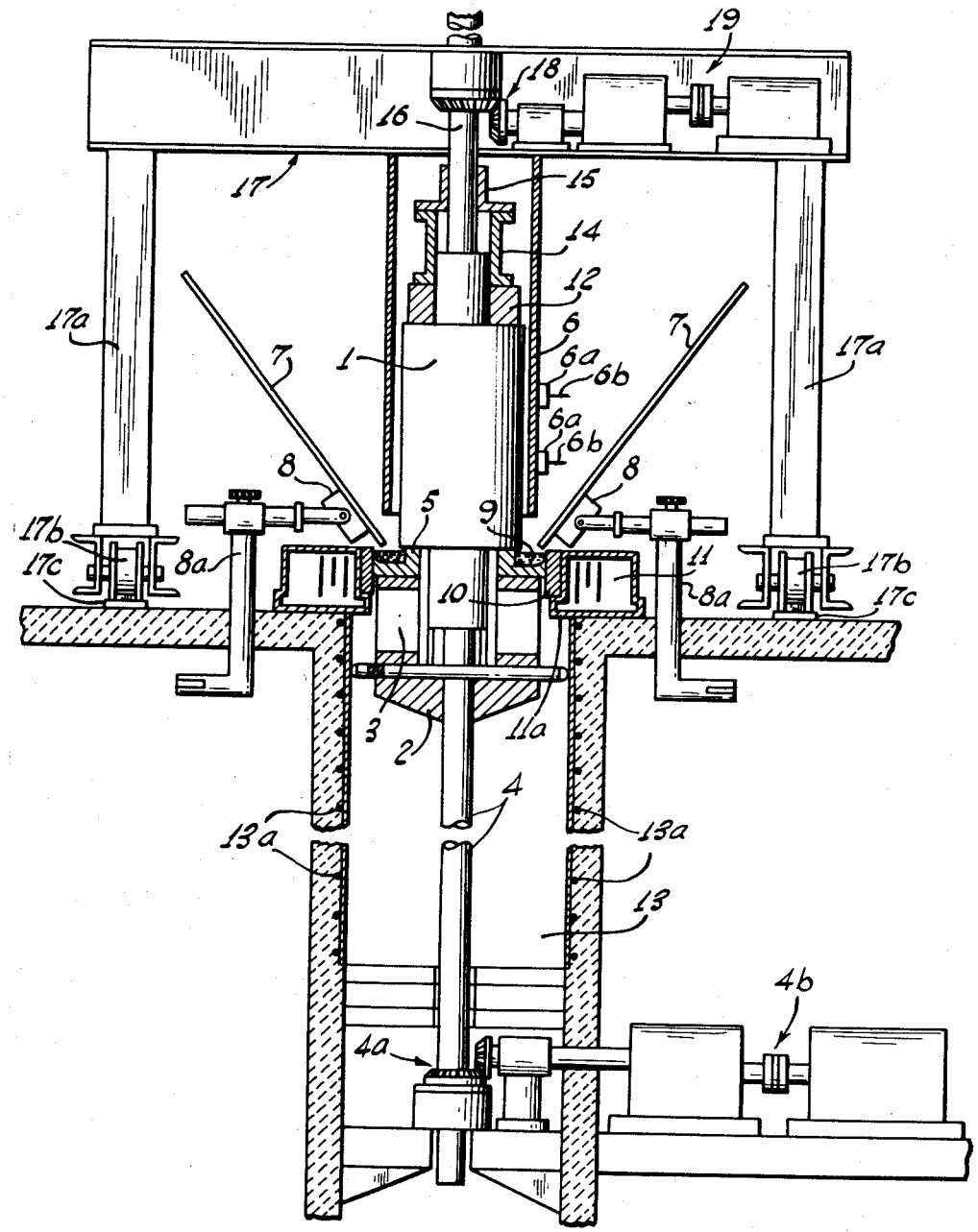

2,937,422

BUILD-UP WELDING

Otto Böhme, Halle, Germany, assignor to VEB (K) Schweisswerk Halle, Halle, Germany Filed May 28, 1957, Ser. No. 662,181

9 Claims. (Cl. 22—57.3)

This invention relates to processes of and apparatus for build-up welding of metallic bodies, especially steel and chilled cast iron rollers.

To those skilled in this art there is known a process which is employed in build-up welding of used and worn down cast iron rollers. In this process, the workpiece, i.e., the roller having a peripheral surface to be built up by welding, is disposed vertically and a ring or disc of the requisite thickness welded to its lower end face, whereafter through stepwise or intermittently continued displacement of the roller together with building up of the coating ring by further welding a new coating or outer surface is applied to the roller. It is also known to carry out connecting, repair and build-up welding of cast steel parts under a slag cover.

According to these known processes, however, build-up welds can be produced only with interruptions, i.e., non-continuously, which is, of course, greatly inimical to the quality of any weld so produced. Due to the temperature drops necessarily occurring during such interruptions, slag particles become included in the weld as well as cavities.

It is, therefore, an important object of the present invention to provide a process and apparatus facilitating avoidance of the above-described disadvantages and drawbacks inherent in the known processes and apparatus of this type.

Another object of the present invention is the provision of means rendering it possible to carry out build-up welding processes in a continuous and highly efficient manner.

It is also an object of the present invention to provide a process and associated means capable of enabling the performance of build-up welding procedures with a minimum of time and labor expenditures and with a maximum degree of assurance as to the absence of faults in the welds so produced.

Still another object of the present invention is the provision of a process of the aforesaid type which is economical and easy to put into practice, together with the provision of means for carrying out such process, which means are simplified and efficacious, thereby reducing the cost of the ultimately produced welded articles.

According to the invention, the advantageous build-up welding of metallic bodies is effected by virtue of the fact that during continuous conducting of workpieces, for example metallurgical rollers, through a melt or bath of molten material by means of a device or apparatus specifically designed therefor, no interruptions of the welding procedure take place, whereby a uniform coating is welded over the desired length and periphery of each of the workpieces.

These and other advantages and objects of the present invention will become more clear from a consideration of the following description in conjunction with the accompanying drawing showing in a single figure a partly sectional, somewhat schematic view of one embodiment of an apparatus constructed in accordance with the invention.

Referring now more particularly to the drawing, it will be seen that a workpiece 1 having an outer surface to be renovated by being subjected to a build-up welding operation rests on a supporting platen or table 2 on which are located guide means 3 for centering the workpiece. The platen 2 is carried by a vertically and rotatably displaceable spindle 4 which extends through a shaft 13 having walls of refractory material in which are embedded or otherwise disposed heating means 13a for a purpose to be more fully explained hereinafter. The lower end of the spindle 4 is connected via bevel gearing 4a to drive means generally designated 4b which may, for example, include a motor and a speed reducer interconnected by suitable clutch means, the drive means 4b effecting downward and rotary motion of the spindle and thus of the workpiece 1 supported thereon. The latter is surrounded and heated by a sleeve 6 on which inductive heating means 6a energized from a suitable current source (not shown) via leads 6b are arranged, the sleeve 6 being carried by a movable bridge-like frame 17 disposed on standards 17a which are mounted on rollers 17b operatively engaging tracks 17c arranged on horizontal extensions of the walls of the shaft 13.

Supported by adjustable mounting means or brackets 8a are two carbon contact elements 8 along which two welding rods 7 made of the material to be welded onto the workpiece 1 may be continuously moved. Disposed on the guide or centering means 3 is a cup-shaped member 5 made of graphitic carbon in which the molten material 9 is to be retained. The member 5 is surrounded by a form ring 10 which defines and predetermines with its inner diameter the outer diameter of the melt 9, the form ring being made of copper, graphitic carbon, tungsten or like materials, by way of example, and being supported in turn by a bottom flange 11a of an annular cooling body or sleeve 11 which may be charged with any desired and appropriate type of cooling medium.

An annular body 12 made of graphitic carbon is arranged on top of the workpiece 1 and constitutes an extension of the latter in the welding region. Simultaneously, the extension 12 serves as a dead head in which detrimental incasement inclusions tending to be formed at the end of the welding procedure may be concentrated, so as to guarantee a fault-free build-up weld on the workpiece 1 itself. In order to ensure an accurate control of the workpiece movement through the welding zone during the welding procedure, there is provided atop the body 12 follower means constituted by a spacer ring 14 and a flanged ring 15. The latter is coupled with a follower spindle 16 carried by the bridging frame 17 and connected via bevel gearing 18 to suitable drive means 19 also carried by the frame 17 and designed for effecting the rotary or downward motion of the spindle 16 required for ensuring that the workpiece follows the movements of the table 2 resulting from the displacement of the driven spindle 4 regardless of the opposition offered by the bath of molten material. The spacer ring which presses on the body 12 prevents upward buoyancy-induced movements thereof during the welding operation.

In operation, at the beginning of the welding procedure, the welding rods 7 are fed along the contact bodies or elements 8 and ignited in any suitable manner so as to melt and form the bath or pool of molten material in the cup member 5. After the bath 9 has attained the desired height, e.g. when its upper surface is substantially even with the top of the form ring 10, the rate of melting of the rods 7 must be so controlled that a sufficient quantity of molten material is continuously added to ensure that the level of the bath is maintained at the predetermined position. Since the bottom of the bath always moves down with the cup 5 and the table 2 while the upper surface of the bath remains essentially stationary, the workpiece 1 upon being lowered (or lowered and rotated) after being preheated by the inductive heating means 6a is conducted through the melt or bath 9 so as to effect concurrent and continuous building up of the outer surface of the workpiece by the welding thereto of the material in the cup. The height or axial dimension of the form ring 10 essentially corresponds with that of the cooling sleeve 11 and is such that the applied welded material, upon leaving the lower confines of the form ring, is already solidified to such an extent that no further deformation can possibly occur. The ultimate cooling of the welded workpiece is regulated by the heating means 13a in the shaft 13 which are so arranged as to provide a temperature gradient decreasing gradually with increasing distance from the top end of the shaft and from the welding region or zone, whereby gradual cooling of the finished workpiece to its final temperature is ensured. The welding operation is, of course, carried on until at least a substantial portion of the body 12 is encased by the molten material, so that any faults resulting from the termination of the welding are formed between said material and the body 12 which is then removed in any suitable manner from the workpiece, whereby the weld between the latter and the applied coating is uniform and fault-free throughout.

It will, of course, be understood that the present invention is susceptible to a number of modifications and variations from the illustrated form thereof without any departure from the scope of the invention as defined in the appended claims. Merely by way of example, it will be appreciated that in lieu of having the workpiece or object 1 move downwardly relative to the upper surface of the bath of molten material 9, the latter may be moved upwardly past and along a stationary workpiece.

I claim:

1. The process of build-up welding a metallic object, comprising the steps of supporting said object for vertical downward movement from a first position to a second position, establishing in a high temperature welding zone between said first and second positions and around the path of movement of said object a bath of molten material to be welded onto said object and having its bottom support arranged for movement with the same, preheating said object while in said first position, moving said object at a controlled speed and without interruption downwardly from said first position into said bath while simultaneously moving said bottom support for said bath downwardly with said object, continually fusing weld material to add more molten weld material to said bath at the top portion thereof to ensure maintenance of the latter at a predetermined level below said first position, whereby said material is welded by fusing with the outer surface of said object, gradually reducing the temperature of said object with said coating welded thereto after passage thereof through said welding zone and during movement toward said second position, providing a body of graphitic carbon on top of said object to constitute a disposable dead head, and continuing movement of said object until said body has passed through said welding zone and said material has been welded thereto, whereby faults normally detrimental to the quality of the weld will be concentrated at said dead head while the weld between said object and said coating is kept free of such faults.

2. Apparatus for build-up welding of a metallic object, comprising means for supporting said object for vertical downward movement through a high temperature welding zone, an annular cup member carried by said supporting means for movement therewith and with said object and containing a mass of molten weld material to be welded onto said object, a form ring positioned in said welding zone about and coaxially with said cup member and defining the outer boundary of said mass of molten weld material, drive means operatively connected to said supporting means for lowering the same at a controlled speed and without interruption to thereby move said object and said cup member and thus the bottom portion of said mass of molten material contained therein downwardly through said welding zone, and means for continually fusing weld material to add extra quantities of said molten material to said cup member to maintain the upper surface of said mass at a predetermined level relative to the uppermost part of said form ring, whereby said material is welded to said object and further comprising a body of graphitic carbon positioned on said object when the latter is on said supporting means, said body constituting effectively an extension of said object and a dead head for concentration thereat of any possible weld faults arising at the termination of the welding procedure subsequent to passage of said body at least partly through said welding zone, and means pressing on said body when the same is positioned on said object to ensure steady passage of the latter through said welding zone regardless of opposition offered by said mass of molten material.

3. Apparatus according to claim 2, further comprising a follower spindle arranged above said object, a flange member coupled to said spindle, a spacer ring positioned on said body and between the latter and said flange member and contacted by the latter, and a drive mechanism operatively connected to said follower spindle for moving the same and thus said flange member and said spacer ring downwardly in synchronism with said object under the action of said drive means, whereby said body and said object are pressed downwardly.

4. Apparatus according to claim 3, further comprising a movable frame including a bridge member located above said welding zone, said bridge member supporting said drive mechanism and said follower spindle.

5. Apparatus according to claim 4, further comprising a sleeve depending downwardly from said bridge member and about said follower spindle, said flange member and said spacer ring, said sleeve partly enclosing said object and said body when the same are located on said supporting means prior to passage through said welding zone, and heating means mounted on said sleeve for preheating said object prior to movement thereof through said welding zone.

6. Apparatus for build-up welding of a metallic object, comprising means for supporting said object for vertical downward movement through a high temperature welding zone, an annular cup member carried by said supporting means for movement therewith and with said object and containing a mass of molten weld material to be welded onto said object, a form ring positioned in said welding zone about and coaxially with said cup member and defining the outer boundary of said mass of molten weld material, drive means operatively connected to said supporting means for lowering the same at a controlled speed and without interruption to thereby move said object and said cup member and thus the bottom portion of said mass of molten material contained therein downwardly through said welding zone, and means for continually fusing weld material to add extra quantities of said molten material to said cup member to maintain the upper surface of said mass at a predetermined level relative to the uppermost part of said form ring, whereby said material is welded to said object and further comprising a vertical hollow shaft provided with walls of refractory material located below said welding zone and defining the path of movement of said object with said coating welded thereto, and heating means carried by said walls at the interior of said shaft and defining in the latter a temperature gradient which decreases with increasing distance from said welding zone, whereby gradual cooling of the weld between said object and said coating is ensured.

7. Apparatus for build-up welding of a metallic object, comprising means for supporting said object for vertical downward movement through a high temperature welding zone, an annular cup member carried by said supporting means for movement therewith and with said object and containing a mass of molten weld material to be welded onto said object, a form ring positioned in said welding zone about and coaxially with said cup member and defining the outer boundary of said mass of molten weld material, drive means operatively connected to said supporting means for lowering the same at a controlled speed and without interruption to thereby move said object and said cup member and thus the bottom portion of said mass of molten material contained therein downwardly through said welding zone, and means for continually fusing weld material to add extra quantities of said molten material to said cup member to maintain the upper surface of said mass at a predetermined level relative to the uppermost part of said form ring, whereby said material is welded to said object and said means for feeding extra molten material into said cup member comprising a pair of carbon electrodes positioned adjacent said welding zone for movement toward and away from the latter, said electrodes being constructed to support welding rods made of said material to be melted, and bracket means supporting said electrodes, respectively.

8. The process of build-up welding of a metallic object comprising the steps of supporting the object for linear movement, positioning atop said object a body of graphitic carbon to constitute an extension of said object and a disposable dead head, providing a high temperature welding zone including a pool of molten material around the path of movement of said object, moving said object at a controlled speed and without interruption into and through said pool of molten material while continually replenishing the same and continuing the downward movement of said object with the bottom support for said pool until at least a predetermined portion of said body has passed through the welding zone and is coated with said material, whereby upon termination of the welding operation any possible faults are concentrated in the junction between said coating and said dead head, and gradually cooling said object including said material welded thereto after passage of the same through said welded zone.

9. The process of claim 8 further comprising the step of rotating said object and said pool during said downward movement thereof through said welding zone.

References Cited in the file of this patent

UNITED STATES PATENTS

| | | |
|---|---|---|
| 1,531,472 | Baker | Mar. 31, 1925 |
| 2,123,894 | Hazelett | July 19, 1938 |
| 2,543,936 | Reynolds | Mar. 6, 1951 |
| 2,692,411 | Brennan | Oct. 26, 1954 |
| 2,707,813 | Dickson | May 10, 1955 |
| 2,729,578 | Hedlund et al. | Jan. 3, 1956 |
| 2,813,190 | Felmley | Nov. 12, 1957 |

FOREIGN PATENTS

| | | |
|---|---|---|
| 876,572 | Germany | May 15, 1953 |